Figure 1:
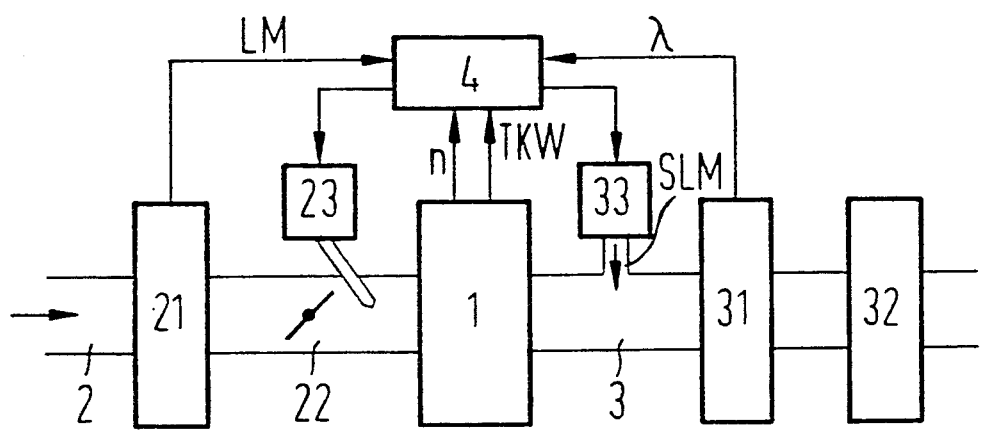

United States Patent [19]
Achleitner et al.

[11] Patent Number: 5,136,842
[45] Date of Patent: Aug. 11, 1992

[54] METHOD FOR HEATING AN EXHAUST GAS CATALYTIC CONVERTER

[75] Inventors: Erwin Achleitner; Friedrich Kapphan, both of Regensburg, Fed. Rep. of Germany

[73] Assignee: Siemens Aktiengesellschaft, Munich, Fed. Rep. of Germany

[21] Appl. No.: 739,350

[22] Filed: Aug. 1, 1991

[30] Foreign Application Priority Data

Aug. 1, 1990 [EP] European Pat. Off. ........ 90114795.9

[51] Int. Cl.$^5$ ............................................. F01N 3/22
[52] U.S. Cl. ...................................... 60/274; 60/276; 60/289; 60/290
[58] Field of Search ............... 60/274, 276, 277, 289, 60/290

[56] References Cited

U.S. PATENT DOCUMENTS

| | | | |
|---|---|---|---|
| 3,949,551 | 4/1976 | Eichler et al. | 60/274 |
| 4,043,310 | 8/1977 | Ichimiya et al. | 123/179.18 |
| 4,231,220 | 11/1980 | Takeda | 60/276 |
| 4,363,210 | 12/1982 | Kawai et al. | 60/276 |
| 4,364,227 | 12/1982 | Yoshida et al. | 60/276 |
| 4,375,746 | 3/1983 | Hattori | 60/274 |
| 4,376,369 | 3/1983 | Horikoshi et al. | 60/276 |
| 4,383,408 | 5/1983 | Ujihashi et al. | 60/274 |
| 4,385,491 | 5/1983 | Sakurai et al. | 60/276 |
| 4,593,524 | 6/1986 | Matsumoto | 60/289 |
| 4,664,081 | 5/1987 | Eheim et al. | 123/380 |
| 4,913,122 | 4/1990 | Uchida et al. | 123/489 |
| 5,012,421 | 4/1991 | Ishii | 346/431.10 |
| 5,014,670 | 5/1991 | Mitsumoto | 123/425 |

FOREIGN PATENT DOCUMENTS

| | | |
|---|---|---|
| 2329539 | 5/1981 | Fed. Rep. of Germany . |
| 3436609 | 5/1985 | Fed. Rep. of Germany . |
| 3506235 | 9/1985 | Fed. Rep. of Germany ........ 60/289 |
| 53-14222 | 2/1978 | Japan ...................... 60/276 |
| 53-22917 | 3/1978 | Japan ...................... 60/276 |
| 58-27809 | 2/1983 | Japan ...................... 60/276 |
| 0210311 | 12/1983 | Japan ...................... 60/276 |
| 61-58912 | 3/1986 | Japan . |
| 61-247810 | 11/1986 | Japan . |
| 62-174524 | 7/1987 | Japan . |
| 63-18122 | 1/1988 | Japan . |
| 1-116213 | 5/1989 | Japan . |
| 1-227815 | 9/1989 | Japan . |

Primary Examiner—Ira S. Lazarus
Assistant Examiner—L. Heyman
Attorney, Agent, or Firm—Herbert L. Lerner; Laurence A. Greenberg

[57] ABSTRACT

A method for heating an exhaust gas catalyst of an internal combustion engine to an operating temperature during a warmup phase includes establishing an enriched mixture as a function of an engine operating state, with a control system. A sensor signal corresponding to a rich or lean mixture is output from a lambda sensor in an exhaust gas system. A quantity of secondary air is blown downstream of outlet valves and upstream of the lambda sensor in the exhaust gas system, from a secondary air pump. A feed quantity of the secondary air pump is pilot-controlled to a stoichiometric exhaust gas ratio, as a function of engine operating parameters, with the control system. The pilot control is corrected with a superimposed closed-loop control in accordance with the sensor signal, starting with operational readiness of the lambda sensor.

15 Claims, 2 Drawing Sheets

METHOD FOR HEATING AN EXHAUST GAS CATALYTIC CONVERTER

The invention relates to a method for heating an exhaust gas catalyst of an internal combustion engine to an operating temperature during a warmup phase, which includes a control system that establishes an enriched mixture as a function of the engine operating state; a lambda sensor in the exhaust gas system which outputs an output signal corresponding to a rich or lean mixture; and a secondary air pump in the exhaust gas system which blows a quantity of secondary air downstream of the outlet valves and upstream of the lambda sensor.

In an internal combustion engine with lambda control, the lambda sensor is typically heated very rapidly to its operating temperature, after starting. In contrast, the heating time for the exhaust gas catalytic converter is correspondingly longer because of its greater mass. The catalyst is heated by various provisions in order to bring the catalyst to its operating temperature as fast as possible during the warmup phase following the starting phase, and thus to exploit the optimal conversion rates.

One such provision is blowing secondary air into the exhaust gas system of the engine. Secondary air is blown through a secondary air pump downstream of the outlet valves during the warmup phase. The catalyst is heated up more rapidly through the reaction of the blown-in air with the hot exhaust gases, and by further oxidation in the catalyst.

At the end of the warmup phase and at the transition from the warmup enrichment, which is controlled as a function of load, to the lambda control, the blowing-in of secondary air is ended. One such system is described, for instance, in an article entitled "Die Abgasreinigung der Neuen Mercedes-Benz 300 SL—24 and 500 SL Aufbau und Wirkungsweise" [Cleaning the Exhaust Gas in the New Mercedes-Benz 300 SL—24 and 500 SL—Structure and Operation] in Motortechnische Zeitschrift [Automotive Engineering Journal] 50 (1989).

According to German Published, Non-Prosecuted Application DE-OS 23 29 539, during warmup for heating up the catalyst, an enriched mixture is established, and the quantity of secondary air is regulated, in accordance with the output signal of a lambda sensor, to a mixture value of 0.985 to 0.995. Tests carried out with such secondary air blowing systems have showed that under various opening conditions, equally good results cannot always be attained if the heating time of the catalyst is shortened.

It is accordingly an object of the invention to provide a method for heating an exhaust gas catalytic converter, which overcomes the hereinafore-mentioned disadvantages of the heretofore-known methods of this general type and which does so in such a way that the shortest possible heating time of the catalyst is attained, and in particular under all operating conditions. Moreover, simple diagnosis of the entire secondary air system should also be possible.

With the foregoing and other objects in view there is provided, in accordance with the invention, a method for heating an exhaust gas catalyst of an internal combustion engine to an operating temperature during a warmup phase, which comprises establishing an enriched mixture as a function of an engine operating state, with a control system; outputting a sensor or output signal corresponding to a rich or lean mixture, from a lambda sensor in an exhaust gas system; blowing a quantity of secondary air downstream of outlet valves and upstream of the lambda sensor in the exhaust gas system, from a secondary air pump; pilot-controlling a feed quantity of the secondary air pump to a stoichiometric exhaust gas ratio, as a function of engine operating parameters, with the control system; and correcting the pilot control with a superimposed closed-loop control in accordance with the sensor signal, starting with operational readiness of the lambda sensor.

In accordance with another mode of the invention, there is provided a method which comprises selecting an enrichment factor of the mixture and an aspirated air mass as the operating parameters.

In accordance with a further mode of the invention, there is provided a method which comprises representing load (for instance air mass, throttle valve angle, intake pipe pressure), rpm and temperature of the engine with the operating parameters.

In accordance with an added mode of the invention, there is provided a method which comprises controlling an electric pump serving as the secondary air pump.

In accordance with an additional mode of the invention, there is provided a method which comprises fixing a feed quantity and controlling a valve of a pump serving as the secondary air pump.

In accordance with yet another mode of the invention, there is provided a method which comprises driving the secondary air pump with a starter motor of the engine.

In accordance with yet a further mode of the invention, there is provided a method which comprises diagnosing the secondary air system with a control deviation.

In accordance with yet an added mode of the invention, there is provided a method which comprises recognizing an error of the secondary air system if the control deviation does not decrease after a control intervention.

In accordance with a concomitant mode of the invention, there is provided a method which comprises recognizing an error of the secondary air system if a product of the aspirated air mass and the enrichment factor is lower than a threshold value, if the secondary air pump is then set to full power, and if a control deviation demanding a greater secondary air quantity still exists.

The invention is based on the discovery that depending on the load status of the engine, during warmup, beyond a certain quantity of blown-in secondary air, cooling occurs that counteracts the heating and accordingly delays it.

The reason for this cooling is the particular conditions during warmup. It is well known that the engine is operated with an enriched mixture at that time, so that as compared with a stoichiometric mixture, there is less air present in the exhaust gas system. As a result of blowing in the secondary air, air is returned to the exhaust gas system and effects better heating. However, that is true only until such time as the quantity of additional secondary air together with the air contained in the exhaust gas corresponds to an approximately stoichiometric ratio. Once this quantity of secondary air is exceeded, the excess air quantity compared with stoichiometric conditions merely results in cooling as a result of the air flow and no longer participates in exothermic chemical reactions. This effect occurs even in the case of a regulated blowing-in of secondary air, because of overshooting and relatively long reaction times, dictated by gas transit times and also by the idle time of the lambda sensor.

The invention accordingly provides for the quantity of blown-in secondary air to be adapted as fast as possible at all times, in accordance with the operating state, so that a stoichiometric ratio is established.

According to the invention, the feed quantity of the secondary air pump is controlled in accordance with the enrichment factor and with the aspirated air mass. The enrichment factor is equivalent to a certain additional quantity of fuel, added to an aspirated air quantity, over that which would be necessary for a stoichiometric mixture. Therefore, in accordance with this increased quantity of fuel, an increased quantity of air is also added by the blowing-in of secondary air, so that stoichiometric conditions again prevail.

According to the invention, the feed quantity of the secondary air pump is adjusted in accordance with the load of the engine, in association with a temperature correction.

This pilot control of the feed quantity of the secondary air pump has a closed-loop control superimposed thereon. This closed-loop control serves to correct a pilot control that may become incorrectly adapted over the course of time.

The output signal of the lambda sensor serves as the actual-value variable for the closed-loop control. Since the lambda sensor already attains its operating temperature shortly after starting, this closed-loop lambda control is already possible during warmup. Since the secondary air quantity is also blown-in upstream of the lambda sensor, the control of the secondary air pump feed quantity can be corrected by the closed-loop lambda control resulting in stoichiometric conditions in the exhaust gas as a result of the secondary air quantity.

A particular advantage of this closed-loop lambda control is the associated capability for diagnosis of the secondary air system. In fact, a reliable conclusion can be drawn from the control deviation as to whether the secondary air system is functioning or not.

A further advantage of the superimposed closed-loop control is the adaptation of the pilot control that thus becomes possible. The pilot control values are varied continuously or from time to time, so that the closed-loop control has to intervene as little as possible. These adaptation values can vary the pilot control values either additively or multiplicatively.

Other features which are considered as characteristic for the invention are set forth in the appended claims.

Although the invention is illustrated and described herein as embodied in a method for heating an exhaust gas catalytic converter, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 2:
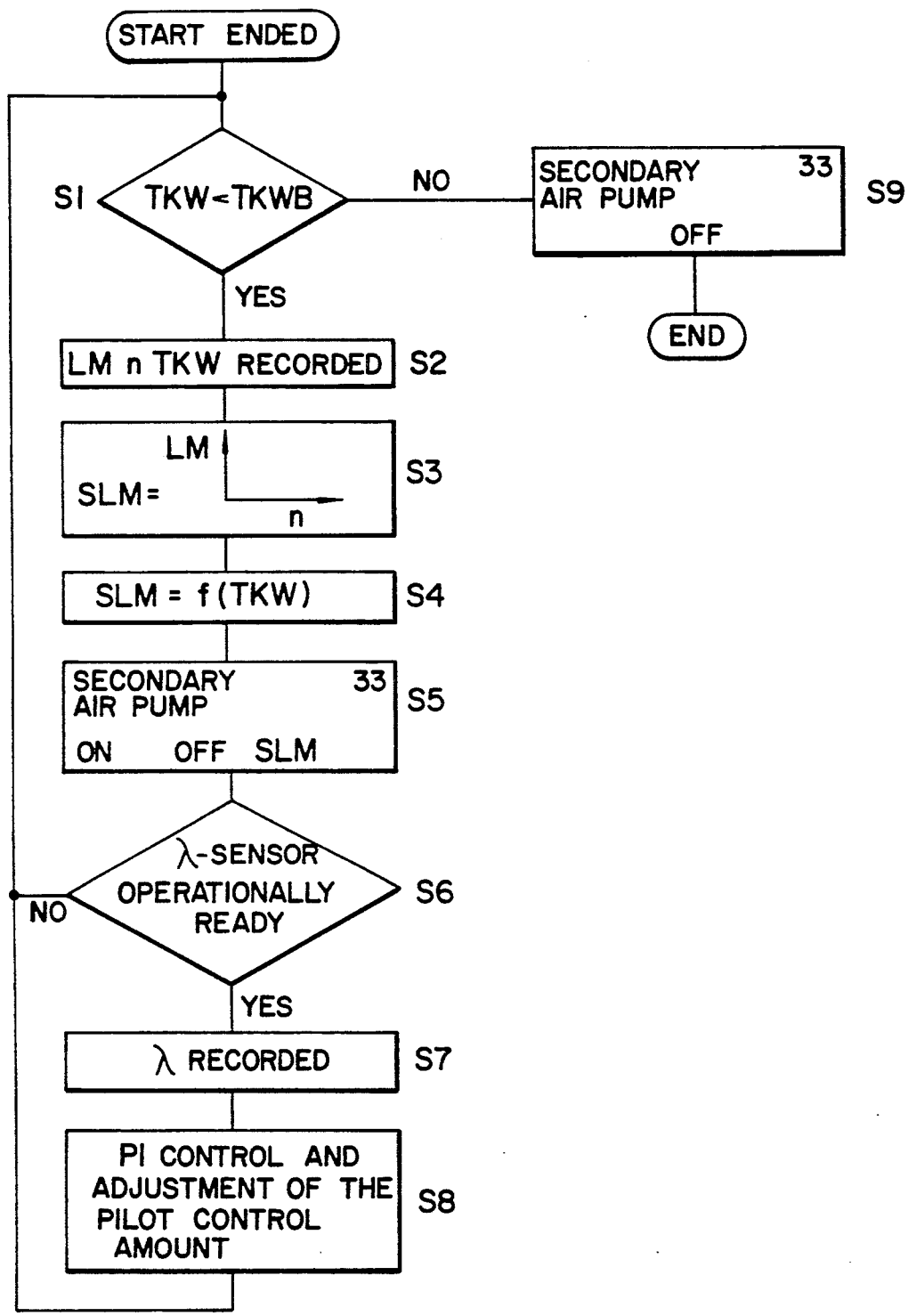

FIG. 1 is a simplified block circuit diagram of an internal combustion engine in which the method according to the invention is employed; and FIG. 2 is a flow chart of a computation routine for carrying out the method.

Referring now to the figures of the drawing in detail and first, particularly, to FIG. 1 thereof, there is seen an engine block 1 with an intake system 2 and an exhaust system 3 connected thereto.

An air flow rate meter 21 that outputs an output signal in accordance with an aspirated air mass LM is disposed in the intake system 2. A driver-actuated throttle valve 22 serves to control the charge or loading. A lambda sensor 31 and a downstream connected catalyst 32 are disposed in the exhaust system 3. The lambda sensor 31 has a two-point characteristic. In other words, it can detect a rich mixture and a lean mixture, and it outputs a corresponding sensor signal $\lambda$.

A control system 4 receives input signals in the form of the air mass LM, the sensor signal $\lambda$ and through appropriate transducers, an rpm n and a coolant temperature TKW of the engine.

On the output side, the control system 4 triggers an injection system 23, which injects fuel into the intake system 3 through injection valves, as is suggested in the drawing. During engine warmup which is dealt with in this case, the control system 4 determines the fuel injection quantity on the basis of the aspirated air mass LM and the rpm n. It additionally takes into account a certain enrichment of the mixture beyond a stoichiometric mixture ratio, because during warmup the engine does require a rich mixture. For this reason, the closed-loop lambda control that is superimposed during normal driving operation is still switched off during the warmup.

Through a further output, the control system 4 controls a secondary air pump 33, which blows-in a secondary air quantity SLM downstream of the outlet or exhaust valves and upstream of the lambda sensor 31. The secondary air pump 33 is an electric pump, for instance a vane cell pump, having an adjustable feed quantity.

If a secondary air pump 33 that is not controllable or in other words furnishes a fixed feed quantity is used, then in that case a controllable valve must be provided in order to adjust the feed quantity. Such a secondary air pump 33 could, for instance, be driven through the existing starter motor or by the engine.

Triggering of the secondary air pump 33 will be described below with the aid of the flow chart of FIG. 2. Once starting has ended, or in other words upon the attainment of a certain minimum rpm has occurred, a check is made in a step S1 as to whether the coolant temperature TKW is less than an operating temperature TKWB of the engine.

If the answer in step S1 is "yes", then the engine is in the warmup mode, and in a step S2, the air mass LM, the rpm n and the coolant temperature TKW are recorded. In a step S3, the secondary air quantity SLM, in other words the air quantity to be pumped by the secondary air pump 33, is read out of a performance graph as a function of the air mass LM and the rpm n. This performance graph is ascertained experimentally, and the values are selected in such a way that a stoichiometric ratio in the exhaust gas results for all load states. In a step 4, the secondary air quantity SLM ascertained in the step S3 is then corrected as a function of the coolant temperature TKW, in order to take into account various enrichment factors for engines at different temperatures.

In a step S5, the control system 4 then switches on the secondary air pump 33 and triggers it in such a way that a feed quantity in accordance with the ascertained secondary air quantity SLM results.

Finally, with steps S6, S7 and S8, from a time of operational readiness of the lambda sensor 31 in the step 6, a closed-loop lambda control superimposed on this pilot control is carried out. The λ of the lambda sensor 31 is recorded in the step S7. Finally, in the step S8, a PI closed loop control function follows, in which the λ value represents an actual variable, λ=1 represents a set-point variable, and the secondary air quantity SLM to be established represents a control variable. In accordance with the control deviation ascertained, adaptation of the performance graph values from the step S3 takes place.

The steps S1–S8 are repeated until such time as it is found in the step S1 that the operating temperature TKWB has been attained and thus the warmup phase has ended. In that case, the blowing-in of secondary air is ended as well, and in a step S9, the secondary air pump 33 is switched off.

The control system 4 also performs a cyclical diagnosis of the function of this secondary air system 33. To this end, it evaluates a control deviation found in step the S8 and the adaptation performed in response thereto. If this adaptation does not lead to a decrease in the control deviation, the conclusion is drawn that there is an error in the secondary system. A thus-recognized error is either stored in an error memory for the next check to be performed in servicing, and/or is displayed directly through an appropriate warning device in the vehicle.

Another possibility for diagnosis of the secondary air system is obtained if the product of the aspirated air mass LM and the enrichment factor is lower than a threshold value. If the secondary air pump 33, in this condition, furnishes a maximal feed quantity in full-load operation, and a control deviation that demands a greater feed quantity still prevails, then the conclusion is drawn that there is an error in the secondary system. The limit value is selected to be low enough to ensure that if the secondary air system is intact, the secondary air pump 33 would have to be triggered only in partial-load operation.

We claim:

1. A method for heating an exhaust gas catalyst of an internal combustion engine to an operating temperature during a warmup phase, which comprises:

establishing an enriched mixture as a function of an engine operating state, with a control system;

outputting a sensor signal corresponding to a rich or lean mixture, from a lambda sensor in an exhaust gas system;

blowing a quantity of secondary air downstream of outlet valves and upstream of the lambda sensor in the exhaust gas system, from a secondary air pump;

pilot-controlling a feed quantity of the secondary air pump to a stoichiometric exhaust gas ratio, as a function of engine operating parameters, with the control system; and correcting the pilot control with a superimposed closed-loop control in accordance with the sensor signal, starting with operational readiness of the lambda sensor.

2. The method according to claim 1, which comprises selecting an enrichment factor of the mixture and an aspirated air mass as the operating parameters.

3. The method according to claim 1, which comprises representing load, rpm and temperature of the engine with the operating parameters.

4. The method according to claim 3, which comprises determining the load from an air mass.

5. The method according to claim 3, which comprises determining the load from a throttle valve angle.

6. The method according to claim 3, which comprises determining the load from an intake pipe pressure.

7. The method according to claim 2, which comprises controlling an electric pump serving as the secondary air pump.

8. The method according to claim 3, which comprises controlling an electric pump serving as the secondary air pump.

9. The method according to claim 2, which comprises fixing a feed quantity and controlling a valve of a pump serving as the secondary air pump.

10. The method according to claim 3, which comprises fixing a feed quantity and controlling a valve of a pump serving as the secondary air pump.

11. The method according to claim 9, which comprises driving the secondary air pump with a starter motor of the engine.

12. The method according to claim 10, which comprises driving the secondary air pump with a starter motor of the engine.

13. The method according to claim 1, which comprises diagnosing a secondary air supply with a control deviation.

14. The method according to claim 13, which comprises recognizing an error of the secondary air supply if the control deviation does not decrease after a control intervention.

15. The method according to claim 13, which comprises recognizing an error of the secondary air supply if a product of the aspirated air mass and the enrichment factor is lower than a threshold value, if the secondary air pump is then set to full power, and if a control deviation demanding a greater secondary air quantity still exists.

* * * * *